(12) United States Patent
Mazyck et al.

(10) Patent No.: US 9,089,816 B2
(45) Date of Patent: Jul. 28, 2015

(54) SYSTEMS AND METHODS FOR POST COMBUSTION MERCURY CONTROL USING SORBENT INJECTION AND WET SCRUBBING

(71) Applicant: Clear Carbon Innovations LLC, Gainesville, FL (US)

(72) Inventors: David W. Mazyck, Gainesville, FL (US); Heather Byrne, Gainesville, FL (US)

(73) Assignee: CARBONXT, INC., Gainesville, FL (US)

( * ) Notice: Subject to any disclaimer, the term of this patent is extended or adjusted under 35 U.S.C. 154(b) by 0 days.

(21) Appl. No.: 14/252,428

(22) Filed: Apr. 14, 2014

(65) Prior Publication Data

US 2014/0308191 A1  Oct. 16, 2014

Related U.S. Application Data

(60) Provisional application No. 61/812,575, filed on Apr. 16, 2013.

(51) Int. Cl.
*B01D 53/34* (2006.01)
*B01D 53/50* (2006.01)
*B01D 53/64* (2006.01)
*B01D 53/74* (2006.01)
*B01D 53/75* (2006.01)

(52) U.S. Cl.
CPC .............. *B01D 53/64* (2013.01); *B01D 53/508* (2013.01); *B01D 2251/608* (2013.01); *B01D 2253/102* (2013.01)

(58) Field of Classification Search
CPC ........ B01D 53/34; B01D 53/50; B01D 53/64; B01D 53/74; B01D 53/75
USPC ........ 95/134; 423/210, 243.01; 422/168, 169, 422/172
See application file for complete search history.

(56) References Cited

U.S. PATENT DOCUMENTS

| | | | |
|---|---|---|---|
| 5,672,323 A * | 9/1997 | Bhat et al. ...................... | 422/172 |
| 5,965,095 A * | 10/1999 | Owens et al. ................. | 423/210 |
| 6,953,494 B2 | 10/2005 | Nelson, Jr. | |
| 8,057,576 B1 | 11/2011 | Pollack | |
| 8,071,060 B2 * | 12/2011 | Ukai et al. ..................... | 423/210 |
| 8,512,655 B2 | 8/2013 | Olson et al. | |
| 8,524,179 B2 | 9/2013 | Durham et al. | |
| 8,551,431 B1 | 10/2013 | Adams et al. | |
| 8,679,430 B2 | 3/2014 | Pollack et al. | |
| 2014/0271418 A1* | 9/2014 | Keiser et al. .................. | 423/210 |

* cited by examiner

*Primary Examiner* — Timothy Vanoy
(74) *Attorney, Agent, or Firm* — Belair Intellectual Property Law LLC

(57) ABSTRACT

A system for cleaning flue gas includes a particulate removal system; a powdered sorbent injector, for injecting powdered sorbents, positioned downstream from the particulate removal system; and a flue gas desulfurization system positioned downstream from the powdered sorbent injector.

19 Claims, 2 Drawing Sheets

SYSTEMS AND METHODS FOR POST COMBUSTION MERCURY CONTROL USING SORBENT INJECTION AND WET SCRUBBING

CROSS-REFERENCE TO RELATED APPLICATIONS

This application claims the benefit of U.S. Provisional Patent Application No. 61/812,575 filed Apr. 16, 2013, which is incorporated by reference to the same extent as though fully contained herein.

BACKGROUND

With the introduction of the first national standards for mercury pollution from power plants in December of 2011, many facilities will turn to sorbent injection to meet the EPA Mercury and Air Toxics Standards (MATS) requirements. Sorbent injection is a technology that has shown good potential for achieving mercury removal to the MATS standards.

While several sorbents are viable for sorbent injection, activated carbon (AC) has been proven to the largest extent. AC is a high surface area sorbent typically created from the activation of coal (or other material high in carbon content) in a controlled environment to create a porous network. This porous network and chemical activity of the AC can be manipulated during activation/manufacturing to create an AC that will preferentially adsorb certain contaminants of concern (e.g., mercury from power plant flue gas to meets MATS standards). Additionally, post activation treatment can be performed to enhance the chemical reactivity of the AC for the target compound(s) of interest. For sorbent injection, the AC is ground and sized to produce powdered activated carbon (PAC), most typically to 95% passing the 325 mesh for mercury capture from flue gas.

Many efforts have been made to improve PAC materials to increase the mercury capture potential and thereby decrease the PAC loading to reduce materials handling and cost burdens. For example, U.S. Pat. No. 6,953,494 describes treating a carbonaceous substrate with an effective amount of a bromine-containing gas; U.S. Pat. No. 8,551,431 describes a sorbent with halogens applied with washing; U.S. Pat. No. 8,057,576 describes a dry admixture of activated carbon and halogen-containing additive; and U.S. Pat. No. 8,512,655 describes a carbon promoted by reaction with a halogen or halide and possibly other components to increase the reactivity of the sorbent. Other attempts have been made to improve the mercury removal from power plant flue gas using halogen additives to the power plant process itself. For example, U.S. Pat. No. 8,524,179 describes adding iodine or bromine to the feed material; and U.S. Pat. No. 8,679,430 describes injecting a halogen compound into the combustion chamber and/or exhaust stream. All of these presented disclosures rely on halogen additives to improve mercury capture. Since bromine is a strong oxidant, it can also cause oxidation and corrosion of the duct system and other equipment with which it comes into contact, causing increased maintenance and cost. Further, there are currently no monitoring requirements for bromine compounds; but if emitted to the atmosphere, it would be detrimental to the environment (e.g., ozone depletion in the air and reaction to form carcinogenic compounds in water). Therefore, it would be advantageous to use alternative methods to reduce sorbent injection rates and still achieve low mercury emissions.

Sorbent injection, as applied for control of mercury for MATS compliance, typically involves the pneumatic conveyance of a powdered sorbent from a storage silo into the process gas of a power plant's flue duct downstream of the boiler and upstream of a particulate control device such as an electrostatic precipitator (ESP) or fabric filter (FF). Once introduced to the process gas, the powdered sorbent disperses and adsorbs mercury and other unwanted constituents in the flue gas. The powdered sorbent with adsorbed mercury (and other constituents) then is captured and removed from the gas by a particulate control device.

In summary, sorbent injection is a proven effective way to remove mercury; however, for some applications, the amount of powdered activated carbon (PAC) required can be very high and, therefore, costly (e.g., because of the high temperatures, short residence times, and numerous other complicating factors). The purpose of this disclosure is to provide a new method of sorbent injection that would reduce sorbent injection rates while not involving other potentially detrimental compounds such as bromine to the solution.

SUMMARY

Embodiments of systems and methods for post combustion mercury control using sorbent (in many cases, activated carbon injection (ACI) systems) and wet scrubbing provide new strategies for removal of mercury that reduces the drawbacks of sorbent injection upstream of or between particulate collection device(s). In many embodiments of this disclosure, the powdered sorbent instead is injected downstream of the traditional particulate removal device(s) (ESP and/or FF) but upstream of a wet flue gas desulfurization (WFGD). While WFGD units are used primarily for the removal of $SO_2$ from the flue gas, in certain embodiments, they also would serve as the particulate control device for the powdered sorbent. This strategy provides the following benefits.

It was discovered that at many power stations, a long duct length exists between the particulate control device(s) and the WFGD. When powdered sorbents are injected just after the particulate control device, this duct length allows for more contact time between the powdered sorbent and mercury and thereby results in increased mercury capture by the powdered sorbents (in comparison to traditional methods that are often constrained to under a few seconds due to short duct lengths and high process gas velocities). As flue gas travels through the ductwork, its temperature decreases. This decrease in temperature improves the amount of mercury captured by the powdered sorbents. With the advantage of more contact time and lower temperature, powdered sorbent injection rates may be significantly reduced to achieve the necessary level of mercury removal. This results in significant cost savings for the utility and decreases solids handling (transportation, storage, and disposal). (Note that WFGDs are discussed herein but, alternatively, similar benefits may be realized when injecting powdered sorbents before a dry flue gas desulfurization (FGD) system.)

In addition to improved temperature and residence time, the concentration of $SO_3$, a deterrent to mercury capture on powdered sorbents, at the injection location disclosed is lower. Even further, if temperatures decrease below the dew point, $SO_3$ will form $H_2SO_4$, which does not have negative impacts on PAC performance (and other sorbents would similarly respond). Decreased concentrations of $SO_3$ will result in improved mercury capture by powdered sorbents, thereby again decreasing necessary injection rates.

After removing mercury from the process gas, the powdered sorbent material will be captured by the WFGD. The powdered sorbent material will mix with the WFGD slurry until it is drained from the system with WFGD solids. In both scenarios, solids can be landfilled or sold as a commodity product. The powdered sorbent in the solids can remain as part of the mixture and, in some instances, improve the toxicity leaching characteristics (as demonstrated with PAC) or be separated from WFGD solids with fine ash using a secondary treatment system (like a hydrocyclone). Also for WFGD units, the powdered sorbent material contributes to the reduction of other unwanted reactions and constituents in the discharged liquid (such as Se, B, As, TOC) after contact with the slurry. In this way, there is the advantage of serving as two treatment processes (one for mercury removal from flue gas and the other for wastewater treatment) encompassed by one material and system. Engineering design of the sorbent further magnifies this benefit through increased removal rates of the target constituents in both processes.

With capture in a WFGD unit, the powdered sorbent material does not come into contact with the fly ash; therefore, the fly ash will be completely unaffected and available for commodity sales. This is a benefit over traditional sorbent injection where powdered sorbent can reach levels in the fly ash that interfere with its ability to be used as a concrete additive.

Several types of powdered sorbents are available for mercury control. Currently, the most applied sorbent is powdered activated carbon (PAC) that has been brominated to encourage oxidation and capture of mercury. Since bromine is a strong oxidant, it also can cause oxidation and corrosion of the duct system and other equipment with which it comes into contact, causing increased maintenance and cost. Further, there are currently no monitoring requirements for bromine compounds; but if emitted to the atmosphere, it would be detrimental to the environment (e.g., ozone depletion in the air and reaction to form carcinogenic compounds in water). A non-brominated sorbent that has a high affinity for mercury is advantageous to avoid these potential issues. Therefore, in some embodiments, in addition to improving the method of sorbent injection as described above, using a non-brominated PAC is prescribed to protect the water quality of the WFGD. Bromine is highly water-soluble and would be removed from the PAC and increase concentrations in the WFGD slurry, causing corrosion and unwanted emissions.

Further, the non-brominated PAC can be an engineered PAC to improve the degree of mercury capture without potential detrimental side effects. For example, a magnetic PAC may be used for removing contaminants such as mercury from fluid streams, including flue gases from a combustion plant. It was discovered that this material also has beneficial properties for wastewater treatment such as from a WFGD system. Thereby, the sorbent has improved mercury capture from the flue gas and improves the water quality of the WFGD discharge with only one material and system.

In one embodiment, a system for cleaning flue gas includes a particulate removal system; a powdered sorbent injector, for injecting powdered sorbents, positioned downstream from the particulate removal system; and a flue gas desulfurization system positioned downstream from the powdered sorbent injector. Optionally, the particulate removal system is a fabric filter. Alternatively, the particulate removal system is an electrostatic precipitator. In one alternative, no other processing apparatus is located between the powdered sorbent injector and the flue gas desulfurization system. In one configuration, no other substance is injected between the powdered activated carbon injector and the flue gas desulfurization system. Optionally, the flue gas desulfurization system is a wet flue gas desulfurization system. Alternatively, an air heater is located upstream from the particulate removal system. Optionally, a selective catalytic reduction is located upstream of the air heater. In one configuration, the system further includes a hydrocyclone in communication with the flue gas desulfurization system, the hydrocyclone used for removing the activated carbon from dewatered slurry resulting from the flue gas desulfurization system. In another configuration, the powdered sorbent is powdered activated carbon. Optionally, the powdered activated carbon is engineered to improve mercury removal without halogens.

In one embodiment, a method of cleaning flue gas includes removing particulates from flue gas using a particulate removal system; injecting powdered sorbent downstream of the particulate removal system; and treating the flue gas in a flue gas desulfurization system positioned downstream from a point where the powdered sorbent is injected. Optionally, the particulate removal system is an electrostatic precipitator. Alternatively, no other processing apparatus is located between the point where the powdered sorbent is injected and the flue gas desulfurization system. In another configuration, no other substance is injected between the point where the powdered sorbent is injected and the flue gas desulfurization system. In one alternative, the flue gas desulfurization system is a wet flue gas desulfurization system. Optionally, an air heater is located upstream from the particulate removal system. Alternatively, a selective catalytic reduction is located upstream of the air heater. Optionally, the method further includes a hydrocyclone in communication with the flue gas desulfurization system, the hydrocyclone used for removing the powdered sorbent from dewatered slurry resulting from the flue gas desulfurization system. Optionally, the powdered sorbent is powdered activated carbon. Alternatively, the powdered activated carbon is engineered to improve mercury removal without halogens.

DESCRIPTION OF THE EMBODIMENTS

Figure 1:
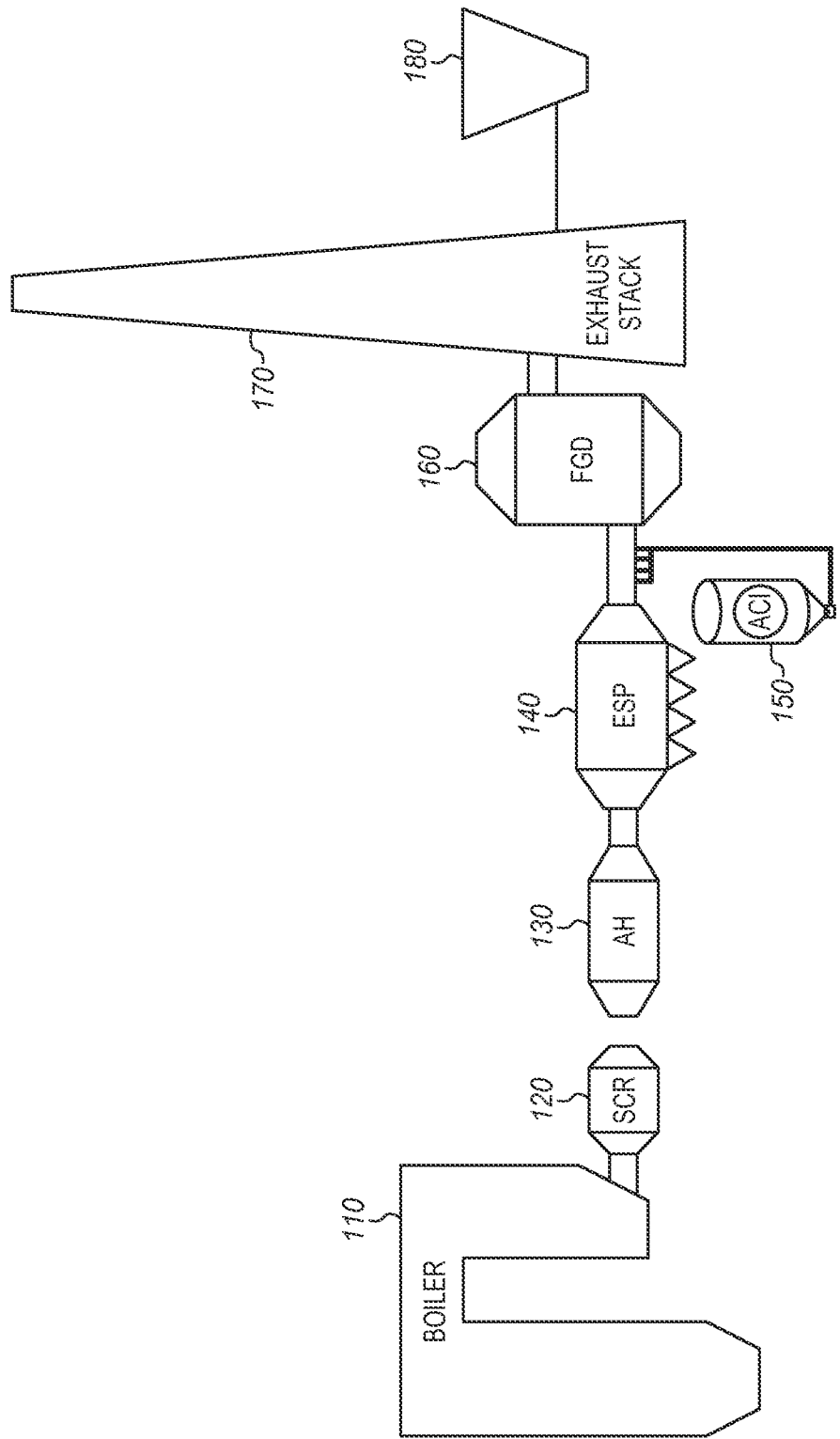
FIG. 1 shows one embodiment of a post combustion mercury control using sorbent (in many cases, activated carbon injection (ACI) system) and wet scrubbing.

Described herein are embodiments for post combustion mercury control using sorbent (in many cases, activated carbon injection (ACI) system) and wet scrubbing (hereinafter "Improved Sorbent Injection System") and methods of using it and making it. In some embodiments, the Improved Sorbent Injection System includes injecting the sorbent at an improved point in the post-combustion cleaning system of a coal-fired power plant (or, in alternatives, other types of power plants and exhaust systems). In some embodiments, the Improved Sorbent Injection System includes injecting the sorbent at a point in the system where it later can be filtered out without affecting other cleaning processes. In many embodiments, the sorbent injected is activated carbon; however, in alternatives, other sorbents may be used. When the term "sorbent" is used herein, in many embodiments this may be activated carbon, although other sorbents may be used.

In coal-fired power plants, mercury capture sorbents typically will be co-collected with other particle matter such as fly ash in an electrostatic precipitator (ESP), fabric filter (FF), an ESP in series with a FF, two ESPs in series, two FFs in series, or similar devices. At this typical injection location (upstream of a particulate collection device), the sorbents' capacity for mercury is limited by the temperatures naturally present (e.g., greater than 350° F.) as the injected sorbents physically and chemically adsorb mercury through endothermic processes.

In such a configuration, the time between the injection point and collection point typically is less than three seconds. Therefore, the adsorption of mercury is limited by diffusion and reaction kinetics possible in this short time. Alternatively, if a fabric filter (FF) is used as the particulate control device, longer residence times can be realized. This technique is not preferred due to the high cost to install and operate FFs as the primary particulate control device.

A drawback to co-collection of sorbents with fly ash has arisen in some scenarios when fly ash is sold as a commodity product. Comingling the sorbent and fly ash makes the mixture of a quality no longer acceptable to sell. To alleviate this issue, two particulate control devices may be employed in series with the second being a FF and sorbent injection for mercury control between the two. This technique segregates the sorbent from fly ash collection and allows for longer contact times for the sorbent to collect mercury. While effective, the capital expenditure, additional operational costs, and pressure drop of the additional FF unit are exorbitant and increase the cost of control. Similarly, sorbent might be injected into the later sections of an ESP so as to try to segregate fly ash material and sorbent. This method, however, even further limits residence time for the carbon to remove mercury, as compared to traditional injection upstream of the ESP so often would not improve mercury removal or injection rates necessary to substantially reduce mercury emissions.

After exiting the particulate control device, the process gas continues through flue gas ducts with decreased levels of mercury and other constituents. At this point, it is either emitted out of the stack or perhaps passes through a wet flue gas desulfurization (WFGD) unit when installed. WFGDs are currently installed on over 50% of the MW capacity in the US to reduce sulfur dioxide ($SO_2$) emissions. While intended for $SO_2$ capture, mercury also can be captured in the WFGD. A high percentage of mercury in the flue gas will partition to a WFGD liquid when it is found in the oxidized form, but the elemental mercury will pass through without capture. Once oxidized mercury is captured in the liquid, however, it can be reduced by chemical reactions to elemental mercury and leave the stack, referred to as "mercury re-emission." Sorbent introduced in the WFGD liquid could sequester mercury species already present in the liquid stream and minimize re-emission of mercury from WFGDs. While this is positive, a significant portion of the mercury (the uncaptured oxidized and elemental mercury fractions) in the original flue gas could "bypass" the WFGD and still contribute to stack emissions.

The above-described injection locations in coal-fired power applications can have some disadvantages. First, as the powdered sorbent mixes with the fly ash, it changes the properties of the mixture that can affect the salability of this byproduct. For example, fly ash often is sold for use as a cement additive. During concrete production, an air-entrained admixture (AEA) also is added to develop strength properties. When powdered sorbents are mixed with fly ash, especially PAC, they can adsorb the AEA, diminishing its effectiveness and requiring more AEA to be added. Increases in AEA add to cost and thereby may prohibit the sale of fly ash for a cement additive. For facilities that sell fly ash, a solution other than a typical PAC injection must be applied to preserve these byproduct sales.

Second, for most facilities, sorbent injection is a retrofit technology applied to the existing infrastructure. Injection locations have to be installed within existing duct networks that may have poor mixing or residence time necessary for high mercury removal. The Improved Sorbent Injection System additionally includes the revelation that the available ESP may be on the hot side of the air-heater, which is a more challenging environment for sorbents to remove mercury because of the elevated temperatures and short residence times. Therefore, the Improved Sorbent Injection System includes the use of alternative injection strategies with longer residence times, better mixing, and lower temperatures that are more advantageous.

For facilities burning bituminous coal with substantial levels of sulfur, sulfur trioxide ($SO_3$) will be generated and be present in the flue gas stream. $SO_3$ also can be found in substantial quantities when power plants inject it to condition fly ash aiding, in its removal. In implementing embodiments of the Improved Sorbent Injection System, it has been noted that PAC and most sorbents traditionally lose their capacity for mercury removal with increasing concentrations of $SO_3$. In implementing embodiments of the Improved Sorbent Injection System, it has been investigated and determined that $SO_3$ concentration will be highest right after the boiler and will decrease through the duct system as it sorbs and reacts with fly ash. Additionally, once the temperature cools sufficiently, it will condense to sulfuric acid mist, which does not adversely affect PAC. In implementing embodiments of the Improved Sorbent Injection System, it has been discovered that with typical PAC injection locations before the ESP/FF, $SO_3$ concentrations are close to the maximum and will cause the largest detrimental effect on mercury removal. Previous mitigation methods are to add a dry sorbent to reduce $SO_3$ concentrations to improve PAC performance. However, this adds more capital and operating costs. Therefore, embodiments of the Improved Sorbent Injection System have been designed to circumvent adverse impacts of $SO_3$.

In embodiments of the Improved Sorbent Injection System, alternative injection strategies are utilized. A standard power plant setup typically includes a boiler, followed by an air heater, and followed by a particulate control device (ESP or FF) that exits in an exhaust stack. As air pollution regulations have become more stringent, additional pollution control devices have been added to the standard power plant configuration. Therefore, selective catalytic reduction (SCR) units could be added between the boiler and the air heater for NOx control. For $SO_2$ control, flue gas desulfurization units (FGD) could be installed between the ESP and exhaust stack.

Embodiments of Improved Sorbent Injection System provide that PAC will no longer accumulate with the fly ash, since the overwhelming majority of fly ash will occur in the traditional particulate capture equipment (i.e., ESP, FF). Therefore, this fly ash byproduct can be used and sold for various purposes, such as for use in concrete. Since the injection point typically is further downstream, effluent will be cooler. The longer residence time and cooler temperature will lead to improved removal of mercury. After the ESP or other particulate control device, gases that might compete with the activity of the PAC in the removal of the mercury will be lessened. Furthermore, the re-emission of mercury likely is reduced, since more of the mercury will be captured in the PAC and is not available for the reaction in the slurry. Since the mercury will not be as available in the slurry, when the slurry is dewatered, the residual mercury and other reaction byproducts in the dewatered slurry will be lessened. By removing the PAC, the WFGD solids byproduct integrity can be maintained for reuse, recycling, or disposal.

Embodiments of the Improved Sorbent Injection System were not known or expected, since the WFGD system is used for control of $SO_2$ gases; and using it for particulate removal of powdered sorbents is an unexpected application. The WFGD is quite suited for the removal of powders, even though this is not a typical application. Mercury removal will occur in the gas phase, and then be retained during contact in the WFGD. Those in the art focus on capturing mercury from the liquid phase of a WFGD. In contrast, the position of the injection of powdered sorbent provides gas phase capture of mercury. Additionally, no other additives are necessary in many configurations. $SO_3$ will be lower downstream of the particulate control devices, thereby reducing the exposure of the sorbent to this detrimental acidic compound and thereby eliminate the need to apply dry sorbent injection to eliminate $SO_3$ before it comes into contact with the sorbent. Also, since the temperature of the flue gas will be cooler at the point of injection, the activity of $SO_3$ is reduced.

In one embodiment, specifically engineered PACs for mercury removal are applied with sorbent injection for mercury removal from coal-fired power plant flue gas. In concert with the engineered PACs, complimentary improvements to the overall system are provided.

In one embodiment, a system for cleaning flue gas includes an articulate removal system. The system further includes a sorbent injector, for injecting the sorbent, positioned upstream from the particulate removal system. The system further includes a flue gas desulfurization system positioned downstream from the sorbent injector. Optionally, the particulate removal system is an ESP. In another alternative, the particulate removal system is a FF or can additionally be a combination of both and ESP and FF. Optionally, no other processing apparatus is located between the sorbent injector and the flue gas desulfurization system. In one configuration, no other substance is injected with the sorbent. In another alternative, no other substance is injected between the sorbent injector and the flue gas desulfurization system. Optionally, the flue gas desulfurization system is a wet flue gas desulfurization system. Alternatively, the system further includes an air heater located upstream from the particulate removal system. In another alternative, the system further includes a selective catalytic reduction unit located upstream of the air heater. Optionally, the system further includes a hydrocyclone in communication with the flue gas desulfurization system, the hydrocyclone used for removing the sorbent from dewatered solids resulting from the flue gas desulfurization system.

In one embodiment, a method of cleaning flue gas includes removing particulates from flue gas using a particulate removal system. The method further includes injecting sorbent downstream of the particulate removal system. The method further includes treating the flue gas in a flue gas desulfurization system positioned downstream from a point where the sorbent is injected. Optionally, the particulate removal system is an ESP. In another alternative, the particulate removal system is a FF or can additionally be a combination of both and ESP and FF. In one configuration, no other processing apparatus is located between the point where the sorbent is injected and the flue gas desulfurization system. In one alternative, no other substance is injected with the sorbent. In another alternative, no other substance is injected between the point where the sorbent is injected and the flue gas desulfurization system. Optionally, the flue gas desulfurization system is a wet flue gas desulfurization system. In one configuration, an air heater is located upstream from the particulate removal system. In another configuration, a selective catalytic reduction system is located upstream of the air heater. Optionally, the sorbent can be separated from the flue gas desulfurization solids using a hydrocyclone in communication with the flue gas desulfurization system, the hydrocyclone used for removing the sorbent from dewatered solids resulting from the flue gas desulfurization system.

Furthermore, if PAC is utilized as the sorbent, it can be engineered also to improve WFGD slurry chemistry and improve the quality of the discharged wastewater. In fact, some systems may teach that merely the injection of PAC prior to the flue gas desulfurization is sub-optimal and call for the injection of additional materials and other treatments. However, by the proper positioning of the injection site of the PAC, at proper temperatures and after the removal of much particulate, with the proper PAC selection an advantageous system is achieved.

FIG. 1 shows one embodiment of an Improved Sorbent Injection System. In this embodiment, the overall power generation system includes a boiler 110 that heats water using coal as fuel. Exhaust from boiler 110 may be fed to selective catalytic reduction (SCR) system 120. SCR system 120 may reduce the concentration of $NO_X$ in the flue gas. The flue gas then may travel to air heater 130 and then to electrostatic precipitator 140. After this point, a sorbent may be added from source 150. In many cases, the sorbent will be activated carbon. The flue gas then proceeds to flue gas desulfurization system 160, where the sorbent is removed along with sulfur components; the remaining gas then is exhausted through stack 170. FIG. 1 also shows optional hydrocyclone 180.

Example 1

Preparation of PAC

A magnetic activated carbon sample with 6% by weight of magnetite ($Fe_3O_4$) was prepared with PAC treated with a wet method to precipitate ferric chloride and ferrous sulfate in 200 lb. batches followed by dewatering and drying at 200° C. The dried product was sieved and resulted in about 95% of the final product passing through a 325-mesh sieve.

Mercury Removal

Figure 2:
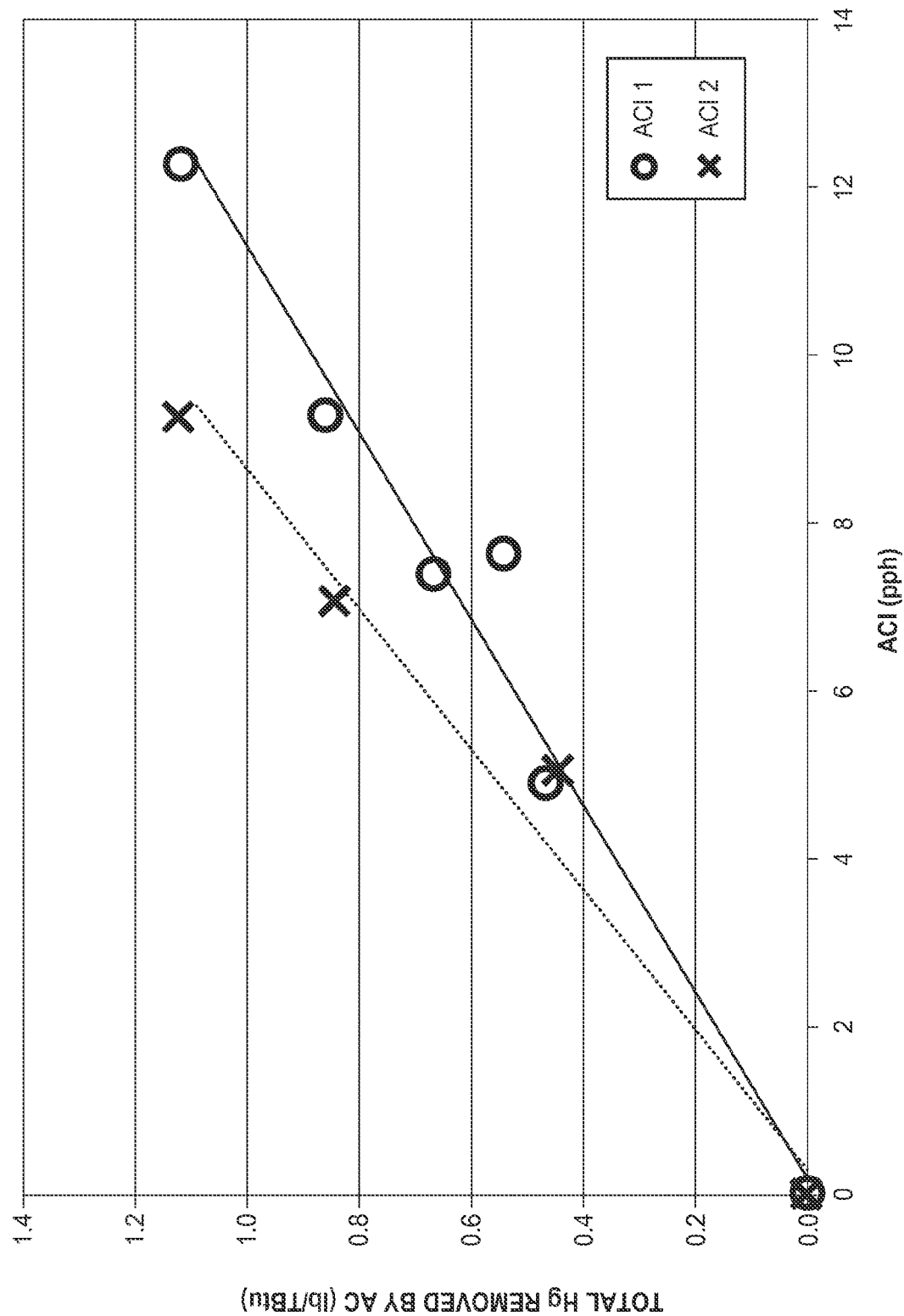
FIG. 2 shows improved mercury capture when using an embodiment of an Improved Sorbent Injection System.

The product was tested at the Mercury Research Center (MRC). The MRC removes a constant flow of approximately 20,500 actual cubic feet per minute (acfm) of flue gas (representative of a 5 molecular weight [Mw] boiler) from the Southern Company Plant Christ Boiler (78 Mw). The boiler runs on a low-sulfur bituminous coal blend from varying sources. The typical $SO_3$ concentration of the fuel blends resulted in about 2 parts per million (ppm) of $SO_3$. FIG. 2 shows improved mercury capture when using an embodiment of an Improved Sorbent Injection System. The product was pneumatically injected at increasing injection rates upstream of the ESP (ACI 1 in FIG. 2) and downstream of the ESP (ACI 2 in FIG. 2). Particulate removal was achieved with the ESP for ACI 1. Particulates remained uncaptured for ACI 2, and returned to the Christ process train. Mercury concentrations were monitored at the MRC inlet and the MRC outlet, and the observed concentrations were converted to pounds per trillion British thermal units (lb/Tbtu) using the standard EPA Method 19. Mercury removal by the AC was calculated as the inlet mercury concentration minus the outlet mercury concentration and is illustrated in FIG. 2. At typical injection rates and above, less AC is necessary to remove the same amount of AC which would result in significant cost savings for the utility.

The previous detailed description is of a small number of embodiments for implementing the systems and methods for an Improved Sorbent Injection System and is not intended to be limiting in scope. The following claims set forth a number of the embodiments of the systems and methods for an Improved Sorbent Injection System disclosed with greater particularity.

What is claimed:

1. A system for cleaning flue gas, the system comprising:
   a particulate removal system;
   a powdered sorbent injector, for injecting powdered sorbents, positioned downstream from the particulate removal system, wherein no powdered sorbent injectors are positioned upstream of the particulate removal system; and
   a flue gas desulfurization system positioned downstream from the powdered sorbent injector, wherein no other processing apparatus is located between the powdered sorbent injector and the flue gas desulfurization system.

2. The system of claim 1, wherein the particulate removal system includes a fabric filter.

3. The system of claim 1, wherein the particulate removal system includes an electrostatic precipitator.

4. The system of claim 1, wherein no other substance is injected between the powdered activated carbon injector and the flue gas desulfurization system.

5. The system of claim 4, wherein the flue gas desulfurization system is a wet flue gas desulfurization system.

6. The system of claim 5, wherein an air heater is located upstream from the particulate removal system.

7. The system of claim 6, wherein a selective catalytic reduction system is located upstream of the air heater.

8. The system of claim 1, further comprising: a hydrocyclone in communication with the flue gas desulfurization system, the hydrocyclone used for removing the activated carbon from dewatered slurry resulting from the flue gas desulfurization system.

9. The system of claim 1, wherein the powdered sorbent is powdered activated carbon.

10. The system of claim 9, wherein the powdered activated carbon is engineered to improve mercury removal without halogens.

11. A method of cleaning flue gas, the method comprising:
    removing particulates from flue gas using a particulate removal system;
    injecting powdered sorbent downstream of the particulate removal system, wherein no powdered sorbent is injected upstream of the particulate removal system; and
    treating the flue gas in a flue gas desulfurization system positioned downstream from a point where the powdered sorbent is injected, wherein no other processing is done between the powdered sorbent injector and the flue gas desulfurization system.

12. The method of claim 11, wherein the particulate removal system includes an electrostatic precipitator.

13. The method of claim 11, wherein no other substance is injected between the point where the powdered sorbent is injected and the flue gas desulfurization system.

14. The method of claim 11, wherein the flue gas desulfurization system is a wet flue gas desulfurization system.

15. The method of claim 14, further comprising: a hydrocyclone in communication with the flue gas desulfurization system, the hydrocyclone used for removing the powdered sorbent from dewatered slurry resulting from the flue gas desulfurization system.

16. The method of claim 11, wherein an air heater is located upstream from the particulate removal system.

17. The method of claim 11, wherein a selective catalytic reduction system is located upstream of the air heater.

18. The method of claim 11, wherein the powdered sorbent is powdered activated carbon.

19. The method of claim 18, wherein the powdered activated carbon is engineered to improve mercury removal without halogens.

* * * * *